United States Patent Office 2,761,849

Patented Sept. 4, 1956

2,761,849

CONDUCTIVE PLASTIC PRODUCT

Myron A. Coler, New York, N. Y.

No Drawing. Application December 27, 1950, Serial No. 203,031

14 Claims. (Cl. 252—518)

This invention relates to electrically conductive plastics, and more particularly, to conductive plastic products of the type wherein electrical conductivity is attained by physically combining conductive inorganic compounds with a plastic. The term "plastic" as used herein embraces any one of a large and varied group of materials commonly referred to as plastics and resins and characterized, i. e., as organic substances of large molecular weight.

In general, the conductive plastics of the present invention have electrical conductivities intermediate between those of the metals and those of untreated plastics. For example, a large group of conductive plastic products may be prepared in accordance with the present invention having conductivities of the order of magnitude of those of aqueous electrolytic solutions. Plastic compositions embodying the present invention are particularly useful in making electrical circuit elements having intermediate conductivities and selected temperature coefficients of resistivity. Precise thermistors which may be mass produced at low cost are made possible by this invention. Moreover, these plastic compositions may be used for a wide variety of other purposes where it is desirable or necessary to have a product which combines moderate conductivity with the desirable properties of the plastics, such as ease of fabrication into intricate shapes, good tensile and mechanical strength, and selected light transmission properties.

Prior efforts to produce electrically conductive articles such as thermistors wherein conductivity is attributable to the presence of conductive compounds have not been entirely successful, largely because of the limitations inherent in the previously proposed techniques. Conductive compounds are generally utilized in such articles to obtain a high temperature coefficient of resistivity which is beyond the scope of the more conventional conducting materials such as carbon and metals. The prior methods include sintering of compacts and processes wherein a compound is melted, formed into the desired shape and then solidified by cooling. It is apparent that since many compounds are not stable under extremes of temperature, etc., that only a select group of compounds could be thus processed. The present invention is not so limited and accordingly permits the utilization of a wide variety of conductive compounds.

Inherent in the teachings of this invention is the efficient utilization of the conductive compound incorporated into the conductive plastic product. This efficiency permits the commercial use of expensive conductive compounds; further, the relatively small quantity of conductive compound required does not undesirably alter the physical properties of the plastic. Moreover, it is surprising to note that in carrying out the teachings of this invention the resulting conductive plastic product often has a higher tensile strength than the unmodified plastic.

A highly desirable feature of the method disclosed hereafter is the good reproducibility of the conductivity from piece to piece. Such reproducibility is of great importance in the manufacture of resistors and similar articles. If conduction is obtained by the incorporation of relatively highly conductive materials, such as carbon or metals, then for units of high ohmic resistance the conductive material content must be restricted to relatively small amounts. Other things being equal, there is a critical concentration of conductive material below which the resistivity tends to increase in a precipitous and erratic fashion. It is apparent that control of reproducibility within this critical range is difficult. Accordingly, this invention provides for the use of conductive compounds which as a class have a lower conductivity than metals and carbons permitting the incorporation of quantities of conductive material sufficiently large to fall beyond the described critical range thus permitting the manufacture of resistors of high ohmic values with accurate control and a high degree of reproducibility.

It is accordingly an object of the present invention to provide an improved electrically conductive plastic. It is another object of the invention to provide a conductive plastic product comprising a plastic and a conductive inorganic compound, and having a high conductivity in relation to the amount of conductive compound incorporated in the product. It is still another object of the invention to provide a conductive plastic product wherein the physical characteristics of the plastic are substantially unchanged. It is a further object of the invention to provide a conductive plastic product which is reproducible both as to conductivity and physical characteristics and of which the conductivity may be accurately predetermined. It is a particular object of the invention to produce a conductive plastic that can be used in making resistors having selected desirable temperature coefficients of resistivity. It is a still further object of the invention to provide a conductive plastic suitable for use at relatively high voltage loads and power dissipation levels. It is still another object of the invention to provide a conductive plastic product having selected optical properties. Other objects of the invention will be in part obvious and in part pointed out hereafter.

The method of the present invention is based on my discovery that by cladding the surfaces of comminuted plastic particles or pellets with a finely divided conductive compound and then molding the desired article from the coated particle the resulting article will have a surprisingly high conductivity in relation to the amount of conductive material incorporated therein; and thus by this technique it is possible to produce conductive plastic products having relatively high conductivity coupled with molding characteristics and physical properties substantially the same as those of the untreated plastic. The quantity of finely divided conductive compound applied is preferably such as to cover a major proportion of the surfaces of the plastic particles to provide a molding powder which may be formed by conventional molding techniques into any of various desired shapes.

From an extended investigation of my invention I have determined that the desired modifications in the electrical properties of plastic articles produced in accordance with the invention is generally assured by controlling simultaneously two factors, i. e., an area factor $R_A$ and a volume factor $R_V$ which are defined as follows:

$$R_A=\frac{A_C}{A_P}$$

$$R_V=\frac{V_C}{V_P+V_C}$$

where $A_P$=area of plastic powder surface
$A_C$=area of plastic powder surface clad with conductive compound
$V_P$=volume of plastic powder
$V_C$=volume of conductive coating Advantageously, $R_A$ should be in the range of about 0.55 to 1.00 while $R_V$ should be in the range of about 0.000095 to 0.70. Preferably, $R_A$ should be made to fall in the range of about 0.90 to 1.00 and $R_V$ in the range of about 0.00096 to 0.37. In general, the quantity of conductive compound applied to the plastic particles is between about 0.1 and 50% based on the weight of the plastic particles.

The product obtained from the coated molding powders of the present invention should not be confused with the familiar conductive rubber compositions and similar types wherein a large proportion of conductive material is fully dispersed in a plastic binder by such techniques as mixing the conductive compound with a solution of the plastic. Where such complete dispersion of the conductive compound in the plastic is effected there is a tendency for the particles of conductive compound to become imbedded in the plastic, and therefore a relatively large amount of conductive compound must be used to obtain sufficient contact between the particles thereof to secure the desired conductivity. With the present process, on the other hand, it is possible to start with the same plastic and the same conductive compound as previously used and achieve equivalent conductivity with a much smaller proportion of conductive compound, e. g., only one-tenth to one-half as much conductive compound, as was required with the dispersion methods. From a practical standpoint, the relatively high loading of conductive compound utilized in the dispersion methods is undesirable since it produces structural weaknesses such as excessive friability and fabricating difficulties; and in general, an undesirable departure from the physical properties of the untreated plastic will result.

The quantity and nature of the conductive cladding on the plastic particles are such that a material improvement in the electrical conductivity of the plastic base is effected without destroying the moldability of the powder. Various theories might be advanced to explain the unexpected phenomenon that plastic particles coated with conductive compound can still be successfully molded into desired products which exhibit a combination of selected characteristics of plastics and conductors. Suffice it to say, however, that it is only necessary to follow the teachings of this invention; the optimum quantity of any given conductive compound for any selected plastic to achieve a desired final result in terms of molded products is determinable by simple preliminary experimentation.

The resin or plastic powder which can be treated by the process of this invention, may be chosen from the large group of molding substances including thermosetting materials like phenolics and urea formaldehyde plastics and thermoplastic materials like polystyrene, polymethylmethacrylate vinyl co-polymers, cellulose acetate, etc. The plastic particles may already contain compounding ingredients such as fillers, like alpha-cellulose, wood flour and mica, lubricants, plasticizers, dyes and pigments.

Any of various conductive compounds can be used in carrying out the process. As indicated in the specific examples given hereafter, the conductivity obtained by using the present method varies appreciably depending upon the type of conductive compound used. However, in all cases, the conductivity obtained with a given type and quantity of conductive compound is substantially greater when using the present method than when using familiar dispersion methods.

A finely divided conductive compound may be applied to the surfaces of the comminuted plastics in any of various ways, but I prefer to use what might be designated as a simple "smearing" technique. I have found that effective cladding of the comminuted particles of most plastics can be achieved by carefully tumbling and/or ball milling the two powders in physical contact with one another. Adhesion promoting conditions, including moderate heating where the plastic is thermoplastic, wetting the surface of the plastic particles with a suitable solvent to increase its tackiness, and the like, may be used if desired. Also it is possible to coat the plastic particles with a conductive compound by treating them with a slurry of the compound. It is important that the plastic should not be in a condition to encase the conductive particles and therefore I prefer, where possible, to use a simple mechanical action such as tumbling or ball milling at room temperature to clad the plastic particles with the finely divided conductive compound.

The term ball milling is used herein in its generic sense to include any milling process carried out in a rotating shell containing the material to be milled and discrete inert articles that assist in the milling operation. The discrete articles are usually steel spheres, but may also have other shapes and be made of other inert materials. Moreover, it should be noted that in the present process, the materials are preferably subjected to only a moderate ball milling, that is, the ball milling is carried out in such a way that aggregates of the conductive compound are broken up to thus produce the desired coating of conductive compound on the plastic particle, but the milling is not carried out under conditions which would favor the fracture of the plastic particles.

In order to point out more fully the nature of the present invention, the following specific examples are given of illustrative methods of preparing conductive plastic products falling within the scope of the present invention.

*Example 1*

A smooth glass-lined container, five inches long and three inches in diameter, containing 400 grams of one-eighth inch steel balls was used as a ball mill. The container was charged with 80 grams of approximately 20 mesh polystyrene beads and 20 grams of silver sulphide, C. P. grade, having an average nominal particle size of the order of 0.0005" as determined by microscopic examination. The container was rotated at approximately 75 R. P. M. for a period of 16 hours at which time about 90% of the surface of the polystyrene beads was covered with silver sulphide.

The resulting particles were compression molded at 350° F. for 10 minutes at 10,000 p. s. i. and cooled under pressure. The molded product had a high negative temperature coefficient of resistivity as indicated by a specific resistance of $7\times10^6$ ohm-cm. at 20° C. and a specific resistance of $4\times10^6$ ohm-cm. at 30° C.

*Example 2*

The container of Example 1 was charged with 40 grams of ferrous-ferric oxide ($Fe_3O_4$), black, C. P. grade (Eimer & Amend I-119) having an average nominal particle size of 0.0003" as determined by microscopic examination and 60 grams of an unmodified unfilled phenol formaldehyde resin having a particle size ranging between 60 and 80 mesh. The container was rotated at 75 R. P. M. for 16 hours tumbling the powders so that over 90% of the surface of the plastic particles was coated by the ferrous-ferric oxide.

The particles were molded at 350° F. for 20 minutes at 10,000 p. s. i. and pulled hot. The molded article had a specific resistance of $1.4\times10^6$ ohm-cm. at 20° C. and a specific resistance of $6\times10^4$ ohm-cm. at 150° C. The molded product thus showed a high negative coefficient of resistance.

*Example 3*

Example 1 was repeated with 20 grams of cuprous oxide ($Cu_2O$), C. P. grade, having an average nominal particle size of 0.0003" as determined by microscopic examination. The molded product had a specific resistance of $4\times10^5$ ohm-cm. at 20° C.

*Example 4*

Example 1 was repeated with 20 grams of a commercial grade of uranium oxides (-ous and -ic, U-8, Eimer & Amend) having an average nominal particle size of 0.0002" as determined by microscopic examination. The molded product had a specific resistance of $4.8 \times 10^5$ ohm-cm. at 20° C.

As indicated in the specific examples, given above, a wide variety of plastics and inorganic conductive compounds are suitable for the practice of the present invention. Thus, the conductive compound may be one that exhibits a high negative temperature coefficient of resistivity such as silver sulphide for use as an electrical circuit element. An element of this type may be readily molded into an optimum configuration. This is an important advantage; for instance, fluid temperature sensing elements may be molded so as to have a high surface area to volume ratio thus avoiding time lags between temperature change of the surrounding medium and that of the element. The previously referred to prior methods for making thermistors often consisted of placing a minute bead of material upon two fine wires. This bead then had to be sealed into a container such as a glass vial to protect it from the effects of the atmosphere. The product of the present invention need not be hermetically sealed into a container for protection against moisture and the atmosphere since, with the exception of the outermost surface, the conductive compound is completely protected by the plastic. Terminals or wire leads may be incorporated by integrally molding them.

This invention is not limited in scope to resistance elements and the like but can be used for a large variety of purposes.

Many inorganic conductive compounds other than those illustrated in Examples 1 to 4 can be utilized in the present method. For example, the conductive lower oxides of titanium, conductive tin compounds, conductive carbides, such as silicon carbide, and conductive nitrides may be used. Lead peroxide is also a useful compound for this purpose. In certain cases combinations of materials are desirably used, as for example when a particular temperature coefficient of resistivity is desired.

In most of the foregoing examples, the conductive compound is applied to the plastic particles in finely divided form, but it is to be understood that the plastic particles may be coated with conductive compounds in other ways as well. For example, a layer of silver may be deposited on the plastic particles by chemical reduction of ammonaical silver in a manner similar to that used in the manufacture of mirrors, by deposition of a silver coating. The silver coating may subsequently be subjected to the action of hydrogen sulphide gas to form a layer of silver sulphide on the plastic particles. The extent to which the particles are coated can be readily determined during the tumbling operation by periodically observing the samples under a microscope.

It will be appreciated that molding powders treated in accordance with the present invention are preferably utilized in compression molding but may also be advantageously utilized in injection and extrusion molding operations.

Articles molded from the coated powders of the present invention are characterized by a reticulate structure of the conductive compound, that is, the articles are predominantly composed of the plastic but have a fine, lacy network of conductive compound therein that provides a multiplicity of conductive paths through the body of the plastic.

In the present application and particularly in the appended claims, the phrase "plastic in comminuted form" is used. It should be noted that the word "comminuted" merely indicates that the plastic is in a discrete particulate form and does not necessarily imply that this particulate form was arrived at by subdivision of larger plastic masses. Similarly, phrases such as "finely divided compound" are not intended to carry any implication as to the manner in which the fine state of subdivision is arrived at.

Since many embodiments might be made of the present invention and since many changes might be made in the embodiment disclosed herein, it is to be understood that the foregoing description is to be interpreted as illustrative only and not in a limiting sense.

I claim:

1. A molding plastic product, adapted for molding conductive plastic articles, consisting essentially of a synthetic organic molding plastic in comminuted form and about 0.1 to 50.0% of a solid insoluble conductive inorganic compound based on the weight of said plastic, said conductive compound being attached to the surfaces of the particles of said plastic, and covering a major proportion of said surfaces to coat the same, said coated particles being plastically deformable to permit molding under the usual molding conditions for the plastic used to produce a product substantially free from voids.

2. A molding plastic product adapted for molding conductive plastic articles, consisting essentially of a synthetic organic molding plastic in comminuted form and about 0.1% to 50% of a solid insoluble conductive inorganic compound based on the weight of said plastic, said conductive compound being applied as a substantially uniform coating on the particles of said plastic, and covering at least about 0.55 of the surface of said particles, said coated particles being plastically deformable to permit molding under the usual molding conditions for the plastic used to produce a product substantially free from voids.

3. The molding plastic product of claim 2, and wherein said conductive compound is silver sulphide.

4. The molding plastic product of claim 2 and wherein said conductive compound is ferrous-ferric oxide.

5. The molding plastic product of claim 2 and wherein said conductive compound is cuprous oxide.

6. The molding plastic product of claim 2 wherein said conductive compound is a mixture of uranous and uranic oxides.

7. A molding plastic product adapted for molding conductive plastic articles, consisting essentially of a synthetic organic molding plastic in comminuted form and a solid insoluble conductive inorganic compound present as a thin coating on the plastic particles, said conductive compound satisfying the requirements that $R_A$ be in the range of about 0.55 to 1.00 and $R_V$ be in the range of about 0.000095 to 0.70 where $$R_A = \frac{A_C}{A_P}$$

and $$R_V = \frac{V_C}{V_P + V_C}$$

$A_P$ being the surface area of said plastic, $A_C$ the surface area of said plastic covered with said conductive compound, $V_P$ the volume of said plastic, and $V_C$ the volume of said conductive compound.

8. A molding plastic product adapted for molding conductive plastic articles, consisting essentially of a synthetic organic molding plastic in comminuted form and a minor proportion by weight of a solid insoluble conductive inorganic compound present as a thin coating on the plastic particles, said conductive compound satisfying the requirements that $R_A$ be in the range of about 0.9 to 1.0 and $R_V$ be in the range of about 0.00096 to 0.37 where $$R_A = \frac{A_C}{A_P}$$

and $$R_V = \frac{V_C}{V_P + V_C}$$

$A_P$ being the surface area of said plastic, $A_C$ the surface area of said plastic covered with said conductive compound, $V_P$ the volume of said plastic, and $V_C$ the volume of said conductive compound.

9. A conductive plastic product molded from the molding powder defined in claim 1.

10. A conductive plastic product molded from the molding powder defined in claim 7.

11. A conductive plastic article substantially free from voids comprising a body of synthetic organic molding plastic having a fine lacy network of solid insoluble conductive inorganic compound extending therethrough and providing a multiplicity of conductive paths through said body of plastic, said conductive compound being present in said article to the extent of 0.1% to 50% of the weight of said plastic.

12. A molding plastic product adapted for molding conductive plastic articles, consisting essentially of a synthetic organic molding plastic in comminuted form, and about 0.1% to 50% of a finely divided solid insoluble conductive inorganic compound based on the weight of said plastic, said conductive compound being attached to the surfaces of the particles of said plastic and covering a major proportion of said surfaces, said coated particles being plastically deformable to permit molding under the usual molding conditions for the plastic used to produce a product substantially free from voids.

13. A molding plastic product adapted for molding conductive plastic articles, consisting essentially of a synthetic organic molding plastic in comminuted form, and about 0.1% to 50% of finely divided conductive metal oxide based on the weight of said plastic, said metal oxide being attached to the surfaces of the particles of said plastic and covering a major proportion of said surfaces, said coated particles being plastically deformable to permit molding under the usual molding conditions for the plastic used to produce a product substantially free from voids.

14. A conductive plastic product molded from the molding powder defined in claim 13.

References Cited in the file of this patent

UNITED STATES PATENTS

| | | |
|---|---|---|
| 1,845,828 | Bradley | Feb. 16, 1932 |
| 1,927,185 | Power | Sept. 19, 1933 |
| 2,010,133 | Bloomenthal | Aug. 6, 1935 |
| 2,171,765 | Rohm | Sept. 5, 1939 |
| 2,175,893 | Hill | Oct. 10, 1939 |
| 2,199,803 | Light | May 7, 1940 |
| 2,245,040 | Marks | June 10, 1941 |
| 2,332,116 | Schmid | Oct. 19, 1943 |
| 2,406,345 | Brennan | Aug. 27, 1946 |
| 2,436,306 | Johnson | Feb. 17, 1948 |
| 2,497,346 | Collins | Feb. 14, 1950 |
| 2,512,463 | Maier | June 20, 1950 |